US010296397B2

(12) United States Patent
Richter et al.

(10) Patent No.: US 10,296,397 B2
(45) Date of Patent: May 21, 2019

(54) AUTOMATED WORKLOAD ANALYSIS AND SIMULATION PROCESS

(71) Applicant: Krystallize Technologies, Inc., Fulshear, TX (US)

(72) Inventors: Roger Richter, Leander, TX (US); Matthew Gueller, Converse, TX (US); James Richard Nolan, Austin, TX (US)

(73) Assignee: Krystallize Technologies, Inc., Fulshear, TX (US)

( * ) Notice: Subject to any disclaimer, the term of this patent is extended or adjusted under 35 U.S.C. 154(b) by 186 days.

(21) Appl. No.: 15/158,544

(22) Filed: May 18, 2016

(65) Prior Publication Data

US 2016/0342446 A1 Nov. 24, 2016

Related U.S. Application Data

(60) Provisional application No. 62/163,293, filed on May 18, 2015.

(51) Int. Cl.
*G06F 9/46* (2006.01)
*G06F 9/50* (2006.01)
(Continued)

(52) U.S. Cl.
CPC .......... *G06F 9/5088* (2013.01); *G06F 9/5083* (2013.01); *G06F 11/302* (2013.01); (Continued)

(58) Field of Classification Search
None
See application file for complete search history.

(56) References Cited

U.S. PATENT DOCUMENTS 8,417,938 B1 * 4/2013 Considine ............. G06F 9/5088 713/151
8,473,959 B2 * 6/2013 Box ...................... G06F 9/5077 718/104

(Continued)

OTHER PUBLICATIONS

Non-Final Office Action dated Dec. 4, 2017 in U.S. Appl. No. 158/158,546, 16 pages.

*Primary Examiner* — Kenneth Tang
(74) *Attorney, Agent, or Firm* — Han Santos, PLLC; Nabil A. Abdalla

(57) ABSTRACT

This disclosure sets forth systems and methods for recommending candidate computing platforms for migration of data and data-related workload from an original computing platform. The systems and methods further describe determining recommendations of candidate computing platforms based on a comparison of key performance and utilization statistics of the original computing platform under a user-generated workload with candidate computing platforms under a synthetic workload. Key performance and utilization statistics may relate to CPU, memory, file I/O, network I/O, and database I/O operations on the respective computing platforms. The synthetic workload may be defined by parameters that simulate the key performance and utilization statistics of the original computing platform under the user-generated workload. Further, the synthetic workloads may be executed on individual candidate computing platforms to determine service level capabilities that are ultimately used to form the recommendation. The recommendation may be further based at least in part on price/performance ratios as defined by separate customer requirements.

20 Claims, 7 Drawing Sheets

AUTOMATED WORKLOAD ANALYSIS AND SIMULATION PROCESS (AWASP) CONTROLLER 102
110(1) 110(2) 110(3)
DISTRIBUTED COMPUTING RESOURCES 108
PQOS AGENT 114(2)
PLATFORM QUALITY OF SERVICE (PQOS) AGENT 114(1)
SECOND CONFIGURATION FILE 120
FIRST CONFIGURATION FILE 116
USER-GENERATED WORKLOAD DATA 118
SYNTHETIC WORKLOAD KEY SYSTEM STATISTICS 122
CANDIDATE COMPUTING PLATFORM(S) 106
ORIGINAL COMPUTING PLATFORM 104
PQOS AGENT (MONITORING STATE) 114(1)
FIRST CONFIGURATION FILE 116
PQOS AGENT (SYNTHETIC LOAD MODE) 114(2)
SECOND CONFIGURATION FILE 120
NETWORK(S) 112

(51) Int. Cl.
*G06F 11/30* (2006.01)
*G06F 11/34* (2006.01)
*H04L 12/24* (2006.01)
*H04L 12/26* (2006.01)

(52) U.S. Cl.
CPC ........ *G06F 11/3495* (2013.01); *H04L 41/145* (2013.01); *H04L 41/5009* (2013.01); *G06F 2209/501* (2013.01); *G06F 2209/5019* (2013.01); *H04L 43/0817* (2013.01)

(56) References Cited

U.S. PATENT DOCUMENTS

| | | | | |
|---|---|---|---|---|
| 9,124,498 | B2 | 9/2015 | Jung et al. | |
| 2009/0217288 | A1* | 8/2009 | Neubauer | G06F 9/505 718/105 |
| 2012/0185868 | A1 | 7/2012 | Bartfai-Walcott et al. | |
| 2016/0239065 | A1* | 8/2016 | Lee | G06F 1/324 |
| 2016/0342447 | A1* | 11/2016 | Richter | G06F 9/5088 |

* cited by examiner

AUTOMATED WORKLOAD ANALYSIS AND SIMULATION PROCESS

RELATED APPLICATIONS

This application claims priority to a commonly owned U.S. Provisional Patent Application No. 62/163,293 filed on May 18, 2015, and titled "Platform Quality of Service (PQoS) Agent and Migration Assistance," which is herein incorporated by reference in its entirety.

BACKGROUND

Traditionally, when migrating data and data-related workload from an original computing platform to a new computing platform, an operator may target a new computing platform with improved hardware components. For example, an operator may select a new computing platform on the basis of any one of an improved processor type, an increase in core count, an increase in random access memory (RAM), an improved operating system, and/or an improved computing storage. Typically, an expectation may be that an improvement in one or more individual hardware components on a new computing platform, may translate into an improvement in service capability of the new computing platform relative to the original computing platform, under a same user-generated workload. However, it is often difficult to quantify such an improvement in service capability, largely because a user-generated workload often performs multiple CPU, memory, file input/output, network input/output operations, each of which uses different combinations of hardware components at differing proportions.

Similarly, new computing platforms may have improvements in software. The new computing platform may have a different operating system version or a different operating system altogether. Further, the new computing platform may have additional system software and/or software capabilities which purport to offer improved performance. However, the new computing platform may not in fact support the improved performance, or the user's actual workload may not be able to realize the promised improvements.

In other words, an improvement in one hardware and/or software component, without a proportional improvement in another, may result in a less than satisfying improvement in service capability.

Therefore, when deciding whether to migrate data or data workload to a new computing platform, there is a need in understanding how different platform architectures perform under a given user-generated workload.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
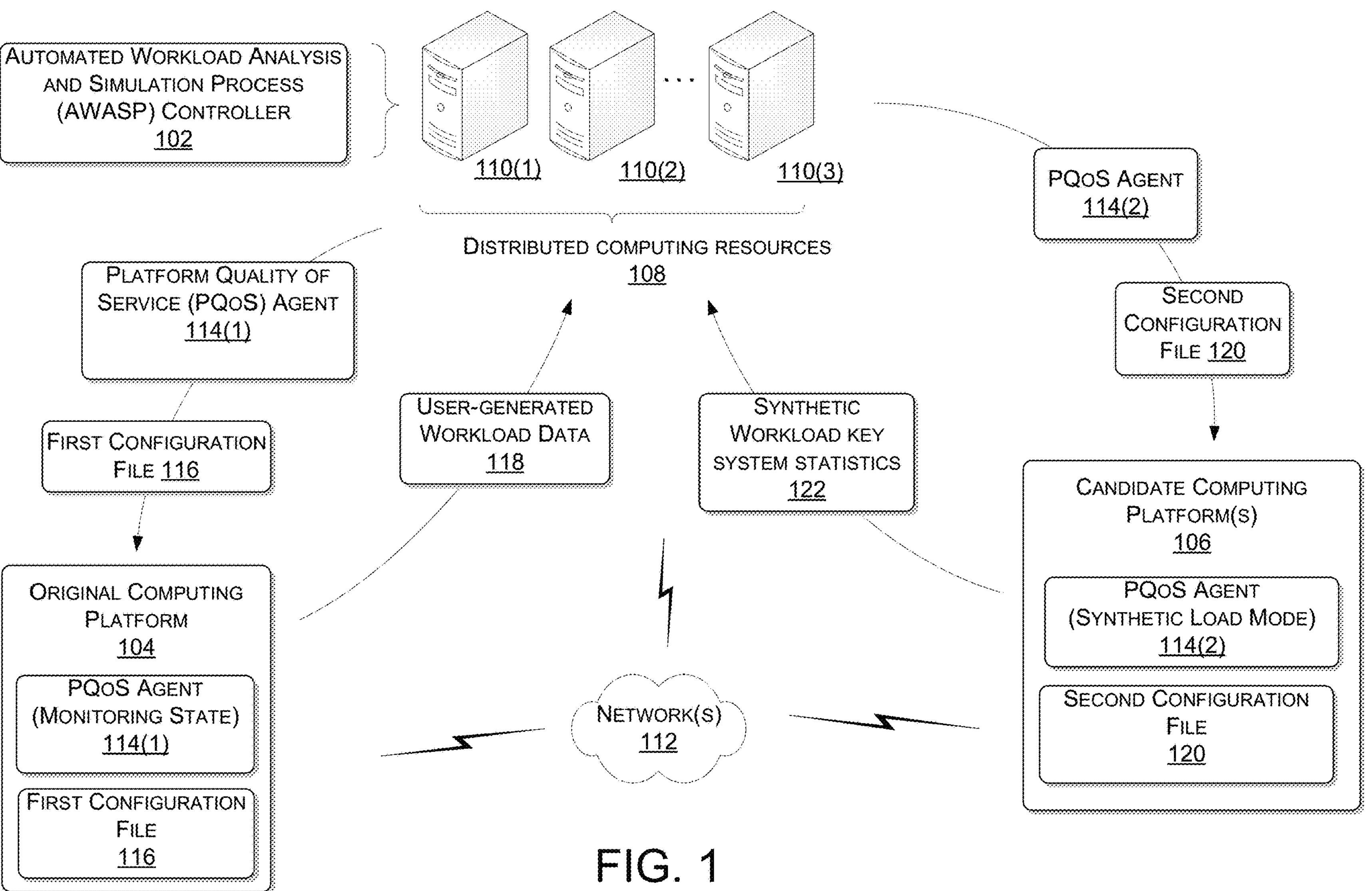
FIG. 1 illustrates a block diagram of an example environment in which an automated workload analysis and simulation process (AWSAP) controller may receive and analyze workload data from an original computing platform, and provide recommendations of candidate computing platforms as suitable migration options.

This disclosure sets forth systems and techniques of an automated workload analysis and simulation process (AWASP) for benchmarking computing platforms, and identifying candidate computing platforms for migration of data and data-related workload. The systems and techniques associated with AWASP may recommend a candidate computing platform based on a comparison of key performance and utilization statistics of the candidate computing platform under a synthetic load, with the key performance and utilization statistics of the original computing platform under a user-generated workload.

In various examples, the AWASP system may include an Automated Workload Analysis and Simulation Process (AWASP) Controller and a Platform Quality of Service (PQoS) Agent. The AWASP controller may execute the automated workload analysis and simulation process (AWASP) and deploy the PQoS Agent onto an original computing platform to monitor and measure performance and utilization characteristics of the original computing platform under a user-generated workload. One feature of the AWASP controller is an ability to generate a synthetic workload that matches the performance and utilization characteristics of the original computing platform under a user-generated workload. However, an accuracy of the synthetic workload is partly based on an amount of historical data from which the AWASP controller may derive the synthetic workload. In other words, generating an accurate synthetic workload may be partly based on the PQoS Agent monitoring and measuring performance and utilization characteristics of the original computing environment over a reasonable amount of time. While what constitutes a "reasonable amount of time" may vary based on the type of user-generated workload, increasing the amount of time that the PQoS Agent may monitor and measure performance and utilization characteristics of the original computing platform may provide enough historical data to tune an accurate synthetic workload.

Once the AWASP controller has received and processed a sufficient amount of historical data from the original computing platform, the AWASP controller may generate a synthetic workload. The synthetic workload may define maximum or near maximum CPU, memory, file input/output (I/O), network I/O, and database I/O operations. In other words, rather than including a script to execute a user-generated workload (also known as "play-back" where the workload was previously recorded), the synthetic workload may define parameters that simulate maximum performance and utilization levels of the original computing platform under the user-generated workload. A benefit of simulating maximum performance and utilization levels of the original computing platform is that an operator may be able to compare performance and utilization characteristics of multiple computing platforms under a simulated user-generated workload. That is, an operator may look beyond processor types and core counts and select a computing platform for migration based on a comparison of multiple axes of performance and utilization characteristics. Exemplary parameters are discussed in more detail later in this disclosure.

Prior to deploying the synthetic workload onto one or more candidate computing platforms, an accuracy of the synthetic workload may be verified. That is, an accuracy of the synthetic workload may be verified by determining that the key performance and utilization statistics of the synthetic workload are substantially similar to the key performance and utilization statistics of the user-generated workload. The key performance and utilization statistics may include performance and utilization statistics that relate to CPU, memory, file I/O, network I/O, and database I/O operations. The AWASP controller may deploy the PQoS Agent to run the synthetic workload on the same computing platform from which the user-generated workload was previously observed. Verifying an accuracy of the synthetic workload ensures that a latter identification of one or more candidate computing platforms for migration, is well substantiated. Thus, once an accuracy of the synthetic workload has been verified, a recommendation may then be made of the candidate computing platforms with the most optimal performance, and the synthetic workload may be re-deployed onto one or more recommended candidate computing platforms. Performance of those recommended candidate computing platforms, specifically of the platforms' respective service level capability may be measured and thereby verified. In a non-limiting example, the service level capability may be expressed in terms of a service capability index (SCI) mark. The term "SCI mark," as used herein, refers collectively to key performance and utilization statistics that include performance and utilization statistics of CPU, memory, file I/O, network I/O, and database I/O operations. Further, the SCI mark may also include a SCI rating and Coefficient of Variance (CoV). The SCI rating and CoV will be discussed in more detail later in this disclosure. The service level capabilities of each candidate computing platform may then be used to identify a computing platform for migration of data and data-related workload from the original computing platform.

The term "workload" as used herein describes a computing systems' ability to handle and process work. As a non-limiting example, workload of a computing system may include memory workload, computer processing unit (CPU) workload, or input-output (I/O) workload. Memory workload can refer to memory use of a particular computing system, or portion of the particular computing system, to over a given period of time, or at a specific instant in time. CPU workload can indicate a number of instructions being executed by one or more processor(s) of a computing system during a given period or at a particular instant of time. I/O workload can refer to an amount of data input that is gathered, or data output that is produced over a given period of time, or at a specific instant in time. Since most computing applications tend to spend a considerable amount of resources gathering input and producing output, analyzing a computing systems' I/O workload may help ensure that appropriate load performance parameters are met.

The term "synthetic workload" as used herein describes a workload that is generated based on different workload patterns of original environment. A synthetic workload can be generated to represent characteristics similar to a stable workload, a growing workload, a cyclic or bursting workload, or an on-and-off workload pattern of the original environment. Key performance and utilization statistics may measure performance of key system components such as but not limited to CPU operations, memory operations, data file input/output operations, and database input/output operations.

The term "techniques," as used herein, may refer to system(s), method(s), computer-readable instructions, module(s), algorithms, hardware logic, and/or operation(s) as permitted by the context described above and throughout the disclosure.

FIG. 1 illustrates a block diagram of an example environment in which an AWASP controller 102 may receive and analyze workload data from an original computing platform 104 and provide recommendations of candidate computing platform(s) 106 as suitable migration options, based on service level capabilities of the candidate computing platform(s) 106. In various examples, the original computing platform and candidate computing platforms may include a bare metal direct-attached storage (DAS) host, a traditional host service, or a cloud-based computing platform. The cloud-based platform may include a public, a private, or a hybrid of public-private cloud-based computing platform.

In the illustrated example, the AWASP controller 102 may operate on one or more distributed computing resource(s) 108. The one or more distributed computing resource(s) 108 may include one or more computing device(s) 110 that operate in a cluster or other configuration to share resources, balance load, increase performance, provide fail-over support or redundancy, or for other purposes.

The one or more computing device(s) 110 may include one or more interfaces to enable communications with other computing device(s), such as the original computing platform 104, and one or more candidate computing platform(s) 106, via one or more network(s) 112. The one or more network(s) 112 may include public networks such as the Internet, private networks such as an institutional and/or personal intranet, or some combination of private and public networks. The one or more network(s) 112 can also include any type of wired and/or wireless network, including but not limited to local area network (LANs), wide area networks (WANs), satellite networks, cable networks, Wi-Fi networks, WiMax networks, mobile communications networks (e.g., 3G, 4G, and so forth) or any combination thereof.

In the illustrated example, the AWASP controller 102 may deploy a Platform Quality of Service (PQoS) Agent 114 to the original computing platform 104 for the purpose of monitoring and measuring performance and utilization characteristics of the original computing platform 104 under a user-generated workload. The AWASP controller 102 may also deploy a first configuration file 116 that identifies key performance and utilization statistics that the PQoS Agent 114 is to monitor and measure on the original computing platform 104. The first configuration file 116 may further identify one or more monitoring instances in which the PQoS Agent 114 is to monitor and measure the key performance and utilization statistics.

The AWASP controller 102 may receive and analyze user-generated workload data 118 for the purpose of generating a synthetic workload that simulates the user-generated workload. The AWASP controller 102 may then re-deploy the PQoS Agent 114 onto one or more candidate computing platform(s) 106 along with a second configuration file 120. The second configuration file 120 may identify key performance and utilization statistics that the PQoS Agent 114 is to monitor and measure on the one or more candidate computing platform(s) 106. The second configuration file 120 may also include parameters that define the synthetic workload. Thus, the PQoS Agent 114 may execute the synthetic workload on the one or more candidate computing platform(s) 106 and measure key performance and utilization statistics under the synthetic workload according to the collocated the second configuration file 120.

Once an execution of the synthetic workload has completed, the PQoS Agent 114 may transmit to the AWASP controller 102, synthetic workload data 122 relating to key performance and utilization statistics of the one or more candidate computing platform(s) 106. In doing so, the AWASP controller 102 may determine a service level capability for each of the one or more candidate computing platform(s) 106, and further generate a recommendation for migration of data and data-related workload from the original computing platform 104.

Figure 2:
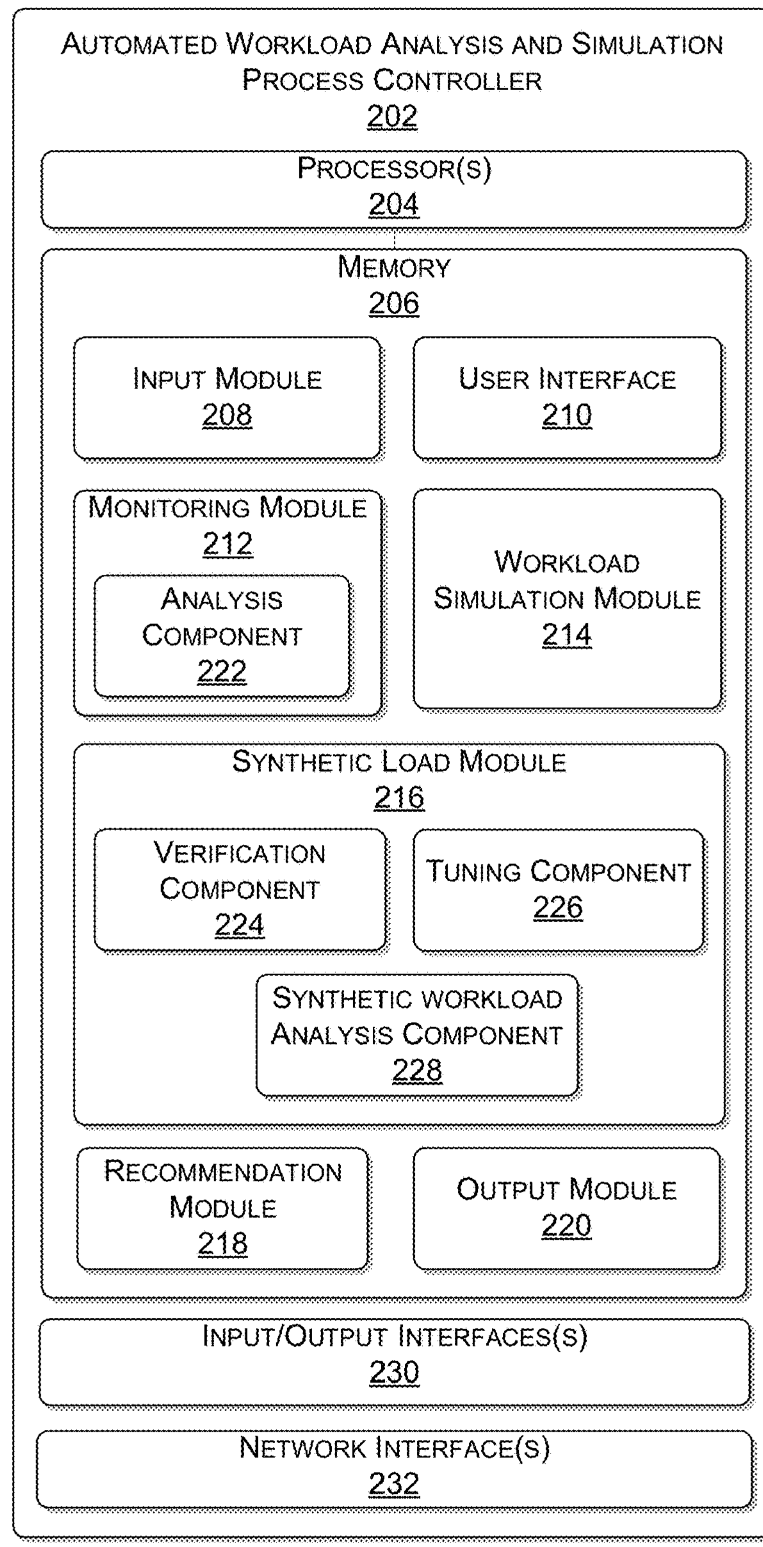
FIG. 2 illustrates a block diagram of an example environment of a AWASP controller.

FIG. 2 illustrates a block diagram of an example environment of a AWASP controller 202. In various examples, the AWASP controller 202 may receive and analyze application workload data and system workload data on an original computing platform, and provide a recommendation of candidate computing platforms suitable for migration of data and data-related workload, based on their respective service level capabilities.

In the illustrated example, the AWASP controller 202 may correspond to AWASP controller 102. In the illustrated example, the AWASP controller 202 may include one or more processor(s) 204 operably connected to memory 206. In at least one example, the one or more processor(s) 204 may be a central processing unit(s) (CPU), graphics processing unit(s) (GPU), both a CPU and GPU, or any other sort of processing unit(s). Each of the one or more processor(s) 204 may have numerous arithmetic logic units (ALUs) that perform arithmetic and logical operations as well as one or more control units (CUs) that extract instructions and stored content from processor cache memory, and then executes these instructions by calling on the ALUs, as necessary during program execution. The one or more processor(s) 204 may also be responsible for executing all computer applications stored in the memory, which can be associated with common types of volatile (RAM) and/or nonvolatile (ROM) memory.

In some examples, memory 206 may include system memory, which may be volatile (such as RAM), non-volatile (such as ROM, flash memory, etc.) or some combination of the two. The memory may also include additional data storage devices (removable ad/or non-removable) such as, for example, magnetic disks, optical disks, or tape.

The memory 206 may further include non-transitory computer-readable media, such as volatile and nonvolatile, removable and non-removable media implemented in any method or technology for storage of information, such as computer readable instructions, data structures, program modules, or other data. System memory, removable storage and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD), Blue-Ray™ or other optical storage, magnetic cassettes, magnetic tape, magnetic disk storage or other magnetic storage devices, or any other non-transitory medium which can be used to store the desired information.

In the illustrated example, the memory 206 may include an input module 208, a user interface 210, a monitoring module 212, a workload simulation module 214, a synthetic load module 216, a recommendation module 218, and an output module 220. The input module 208 may receive workload data from a PQoS Agent that has been deployed on a computing platform. The workload data may correspond to key performance and utilization statistics of the computing platform under a user-generated workload or a synthetic workload. Further, the computing platform may correspond to an original computing platform for which the AWASP controller 202 may recommend a candidate computing platform for migration. Alternatively, or additionally, the computing platform may correspond to the candidate computing platform itself.

Figure 3:
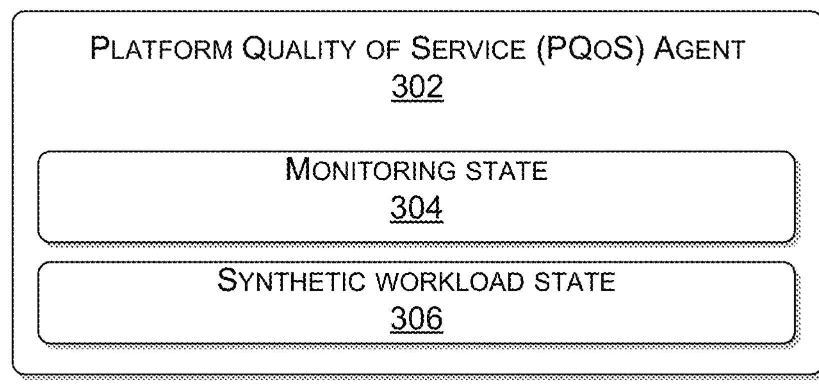
FIG. 3 illustrates a block diagram of an example Platform Quality of Service (QoS) Application.

In the illustrated example, the monitoring module 212 may deploy a PQoS Agent in a monitoring state along with a configuration file, onto a computing platform. In doing so, the PQoS Agent may monitor and measure performance and utilization characteristics of the computing platform. The PQoS Agent, as described in more detail in FIG. 3, is an application that runs on the computing platform. In a monitoring state, the PQoS Agent may monitor and measure key performance and utilization statistics according to parameters specified within a collocated configuration file. The configuration file may also indicate one or more monitoring instances in which the PQoS Agent is to monitor and measure the key performance and utilization statistics.

In the illustrated example, the monitoring module 212 may include an analysis component 222. The analysis component 222 may determine performance and utilization characteristics of a computing platform based on workload data received from the PQoS Agent in the monitoring state. The analysis component 222 may aggregate workload data received from multiple monitoring instances of the computing platform to determine maximum performance levels that relate to CPU, memory, file I/O, network I/O, and database I/O operations. In some examples, the analysis component 222 may determine a resource demand index (RDI) that represents the maximum performance and utilization workload demand of the computing platform. The RDI may use some, but not all, of the key performance and utilization statistics derived from the computing platform. In a non-limiting example, the RDI may be a function of network I/O, CPU, and memory operations, and based on the following formulae $$RDI = \left(\text{Storage } I/O + \frac{\text{storage bytes}_{rcvd} + \text{storage bytes}_{transferred}}{1000}\right) \times 1.5 + \text{Network}\frac{\text{Packets}}{\text{sec}} + \frac{\text{Network bytes}_{transferred} + \text{Network bytes}_{rcvd}}{1000} + (CPU\ \% \times 10) + \text{Memory } \%.$$

Note that storage I/O, storage $\text{bytes}_{rcvd}$ and storage $\text{bytes}_{transferred}$ relate to data being communicated between storage media and other parts of the computing platform. In other examples, the performance and utilization workload demand may be a function of any other combination of CPU, memory, file I/O, network I/O, and database I/O operations on the computing platform.

Further, the analysis component 222 may determine a Service Capability Index (SCI) mark for the computing platform based on the workload data received from the PQoS Agent. The SCI mark may include an SCI rating, a coefficient of variance (CoV), and performance and utilization statistics relating to CPU, memory, file I/O, network I/O, and database I/O operations. The SCI rating describes a single value term that represents workload on a computing platform. The SCI rating may be determined as a function of CPU, memory, file I/O, and network I/O performance parameters. In a non-limiting example, an SCI rating may be a function of CPU operations and file I/O operations based on the following formulae: SCI rating=CPU Operations×(6×File I/O Operations). A benefit of the SCI Rating is that it combines select performance parameters of a computing platform into a single value. In doing so, the SCI Rating may streamline a selection of a computing platform based on client requirements. In the preceding example, the rating enables numerically distinguishing a compute-optimized virtual machine from a storage-optimized virtual machine. Other combinations are possible.

Further, the Coefficient of Variance (CoV), also known as relative standard deviation, is a standardized measure of dispersion of a probability or frequency distribution. In other words, it is defined as a ratio of a standard deviation of the SCI rating to the mean or absolute SCI rating.

In various examples, the analysis component 222 may determine a SCI mark for an original computing platform and one or more candidate computing platforms. Further, a set of candidate computing platforms may be identified by comparing a SCI mark assigned to respective candidate computing platforms within the set of candidate computing platforms, to the SCI mark assigned to the original computing platform. In some examples, the comparison may be based on one or more components of the SCI mark, such as the SCI rating, the CoV, or the performance and utilization statistics relating to CPU, memory, file I/O, network I/O, and database I/O operations. Further, the comparison may be based on the one or more components of the SCI mark being within a predetermined threshold. Once a set of candidate computing platforms have been identified, the synthetic workload may be deployed onto each candidate computing platform within the set of candidate computing platforms to verify a respective service level capability.

In the illustrated example, the workload simulation module 214 may generate a synthetic workload using user-generated workload data received from the monitoring module 212. The purpose of generating a synthetic workload is to simulate the user-generated workload monitored on the original computing platform. In doing so, a simulated synthetic workload may then be deployed on one or more candidate computing platforms to measure their respective service level capability. The service level capabilities of each candidate computing platform may then be used to recommend a computing platform for migration of data from the original computing platform.

The synthetic workload may define maximum or near maximum CPU, memory, file I/O, network I/O, and database I/O operations that are derived from the user-generated workload. In other words, rather than including a script to "play-back" a user-generated workload, the synthetic workload may define parameters that simulate maximum performance and utilization levels of the original computing platform under the user-generate workload.

The workload simulation module 214 may generate a synthetic workload by defining workload behaviors of at least five classes of algorithms that include CPU, memory, network I/O, file I/O, and database I/O operations. The behavior and performance of each algorithm class may be controlled by a basic set of general algorithm class parameters that define and drive load behaviors in each algorithm class. The general algorithm class parameters are set based on user-generated workload data received from the analysis component 222 of the monitoring module 212. In a non-limiting example, algorithm classes for CPU, memory, network I/O, and file I/O operations may share general algorithm class parameters that include function, thread count, and intensity.

The function parameter may define and drive certain load patterns in each algorithm class. For example, load patterns may correspond to a stable workload, a growing workload, a cyclic or bursting workload, an on-and-off workload, a random workload, or a derivation of any combination of workload patterns.

The thread count parameter may indicate a number of threads to spawn for each algorithm class. In a non-limiting example, the thread count for a memory operation may correspond to three, while the thread count for a file I/O operation may correspond to six.

The intensity parameter may scale the workload of a particular thread relative to other threads that are being executed in combination. In a non-limiting example, consider a synthetic workload that simulates a file I/O operation in combination with a memory operation. The AWASP controller 202 may specify a higher intensity setting for the file I/O operations relative to memory operations. This can cause threads associated with a file I/O operation to have higher scaled workloads relative to memory operations. In doing so, results from the synthetic workload may help discern whether performance characteristics of a candidate computing platform are limited by file I/O operations.

In various examples, the behavior and performance of each algorithm class may be further controlled by a set of function-specific parameters. For example, the algorithm class for CPU operations may include a CpuOpsSpan function-specific parameter. The CpuOpsSpan parameter determine the number of CPU operations that the CPU threads execute before yielding to other thread pools.

The algorithm class for memory operations may include 'memory block size' and 'memory user percentage' function-specific parameters. The 'memory block size' parameter may determine a block size of memory for allocation when accruing memory. The 'memory user percentage' parameter may determine an overall amount of memory for allocation.

The algorithm class for file I/O operations may include 'I/O size', 'read ratio', 'filesize', 'fileset' and 'fileOpsBoff' function-specific parameters. The term 'Boff' may refer to "back off," or a measurement relating to thresholds for retrying operation failures. The 'I/O size' parameter may determine a size of the input/output operation for all read and write operations. In a non-limiting example, the 'I/O size' parameters may be defined in any appropriate unit of file size measure, including bytes. The 'read ratio' parameter may determine a ratio of file read operation versus a file write operation. In a non-limiting example, a 'read ratio' parameter of 20 would indicate that 20% of file I/O operations involve a file read operation whiles 80% involve a file write operation. The 'fileset' parameter may indicate the number of files, per thread, that may be generated by each file I/O operation thread. Further, the 'fileOpsBoff' parameter may indicate a particular interval of back-off time to insert between file I/O operations. The fileOpsBoff parameter may be applied to all file I/O operations threads. The back-off time may be defined in any appropriate unit of time measure, including milliseconds.

The algorithm class for network I/O operations may include 'packet size', and 'target bitrate' function-specific parameters. The 'packet size' parameter may determine a target packet size to be used for generating network traffic. The 'packet size' parameter may be defined in any appropriate unit of file size measure, including bytes. The 'target bitrate' parameter may determine a target bitrate, per connection, that may be used for network traffic.

In various examples, the algorithm classes, parameters, and function-specific parameters may be used as 'levers and knobs' to tune a synthetic workload to match a target pattern of a user-generated workload.

In the illustrated example, the synthetic load module 216 may deploy a PQoS Agent in a synthetic load state on a computing platform. The synthetic load module 216 may further define and deploy a configuration parameter set with the PQoS Agent that enables the PQoS Agent to execute the synthetic workload on the computing platform. The configuration parameter set may define load behavior for individual algorithm classes that make up the synthetic workload. The algorithm classes may be associated with CPU, memory, file I/O, network I/O, and database I/O operations. Further, the load behavior of each algorithm class may be defined by configuring general algorithm class parameters such as function, thread count, and intensity, as well as function-specific parameters associated with each individual algorithm class.

In various examples, the synthetic load module 216 may generate a synthetic workload that executes algorithm classes in a particular sequential order. In some examples, the sequential order may be determined by an understanding of whether some operations have a greater influence in simulating a representative workload. For example, if it is determined that file I/O operations greatly influence matching a synthetic workload with a user-generated workload, the algorithm classes may be executed in an order of file I/O, network I/O, CPU, and memory operations. In other examples, the synthetic load module 216 may generate a synthetic workload that executes algorithm classes in parallel.

In response to executing the synthetic workload on a computing platform, the PQoS Agent may monitor and measure key performance and utilization statistics of the computing platform under the synthetic workload. In some examples, the synthetic load module 216 may re-deploy the PQoS Agent on the same original computing platform that the PQoS Agent had initially been deployed in a monitoring state. The purpose of doing so is to ensure that the synthetic workload generates a workload that is substantially similar to the previously observed user-generated workload. That is, a similarity of the synthetic workload to the user-generated workload is verified. Further, by using the same computing platform to measure key performance and utilization statistics of the synthetic workload and the user-generated workload, any discrepancy between the respective key performance and utilization statistics cannot be attributed to differences in the computing platform infrastructure.

In other examples, the synthetic load module 216 may deploy the PQoS Agent in a synthetic load state on candidate computing platforms to measure key performance and utilization statistics of the candidate computing platforms under the synthetic workload. The purpose of doing so is to determine a service level capability of the candidate computing platforms under a synthetic workload that is substantially similar to the user-generated workload that was previously observed on the original computing platform.

It is noteworthy that all other user applications should be closed on a computing platform while the synthetic workload is being run. This ensures that the PQoS Agent monitors and measures performance data attributed solely to the synthetic workload.

In the illustrated example, the synthetic load module 216 may include a verification component 224. The purpose of the verification component 224 is to verify that the synthetic workload simulates the performance and utilization characteristics of the original computing platform under a user-generated workload. The verification component 224 may compare key performance and utilization statistics of a synthetic workload with the key performance and utilization statistics of a user-generated workload. The verification component 224 may further quantify a difference between the key performance and utilization statistics of the synthetic workload and the user-generated workload. In a non-limiting example, if the quantified difference between the key performance and utilization statistics is within a predetermined tolerance, the workload comparison component may indicate that the synthetic workload is substantially similar to the user-generated workload. The predetermined tolerance may be based on a user input via the user interface 210. Alternatively, if the quantified difference between the key performance and utilization statistics is not within the predetermined tolerance, the workload comparison component may indicate that the synthetic workload is not similar enough to the user-generated workload, and thus cannot be used as part of a process for selecting a candidate computing platform.

In the illustrated example, the synthetic load module 216 may further include a tuning component 226. From the example above, if the quantified difference between the key performance and utilization statistics of the synthetic workload and the user-generated workload are not within the predetermined tolerance, the tuning component may re-configure the synthetic workload and cause the re-configured synthetic workload to be re-run until an appropriate result can be achieved. The synthetic workload may be re-tuned by modifying parameters that relate to function, thread count, intensity, as well as function-specific parameters that relate to CPU, memory, file I/O, network I/O, and database I/O operations. In a non-limiting example, a function-specific parameter that determines a number of CPU operations may be re-tuned to re-configure the CPU operation. In another non-limiting example, function-specific parameters that determine I/O size, or file size may be re-tuned to re-configure the file I/O operation.

In the illustrated example, the synthetic load module 216 may include a synthetic workload analysis component 228. The synthetic workload analysis component 228 may analyze synthetic workload data that is received from a PQoS Agent that is deployed on a candidate computing platform in a synthetic load state. The synthetic workload analysis component 228 may aggregate synthetic workload data to determine maximum service level capability of the computing platform under the synthetic load. In a non-limiting example, the service level capability may be expressed in terms of a SCI mark that includes a SCI rating, a CoV, and performance and utilization statistics relating to CPU, memory, file I/O, network I/O, and database I/O operations.

In the illustrated example, the recommendation module 218 may identify one or more candidate computing platforms for migration of data and data-related workload from an original computing platform. The recommendation module 218 may receive a data from the synthetic load module 216 that indicates one of two possible outcomes, namely that a candidate computing platform has met or exceeded workload expectations as simulated by the synthetic workload, or that a candidate computing platform has not met workload expectations as simulated by the synthetic workload.

In the illustrated example, the recommendation module 218 may identify one or more candidate computing platforms for migration of data and data-related workload from an original computing platform. The recommnedation module 218 may receive data from the synthetic load module 216 that indicates one of two possible outcomes, namely that a candidate computing platform has met or exceeded workload expections as simulated by the synthetic workload, or that a candidate computing platform has not met workload expectations as simulated by the synthetic workload.

The recommendation module 218 may further include a platform indexing ranking and rating service (PIRRS) that may be used to identify a candidate computing platform with an SCI mark that is similar to the SCI mark of the original computing platform. In this example, a comparison of the SCI mark for a candidate computing platform to the SCI mark assigned to the original computing platform may help reduce the list of prospective candidate computing platforms for migration. The PIRRS may provide comparative data relating to one or more components of the SCI mark for each candidate computing platform, such as SCI rating, the CoV, or the performance and utilization statistics relatiing to CPU, memory, file I/O, network I/O, and database I/O operations. Once a list of candidate computing platforms has been identified as having comparable SCI marks to the original computing platform, the synthetic workload may be deployed onto each candidate computing platform within the list of candidate computing platforms, to verify a respective service level capability. Further, in the event that one or more candidate computing platforms have met or exceeded workload expectations as simulated by the synthetic workload, the PIRRS may rank each candidate computing platform in an order that reflects performance, or in an order based on customer requirements. In the latter case, customer requirements may rank candidate computing platforms based on any combination of criteria, including price/performance ratio. In other words, a candidate computing platform with less than optimal performance characteristics, may be preferred in view of projected cost savings of another candidate computing platform with less than optimal performance characteristics.

In the event that the one or more candidate computing platforms have not met workload expectations as simulated by the synthetic workload, the recommendation module 218 may recommend an inclusion of additional computing platform infrastructure. For example, the recommendation module 218 may recommend an inclusion of additional CPU, memory, file I/O, network I/O, or database I/O infrastructure to alleviate any deficiencies identified in data from the synthetic load module 216.

In the illustrated example, the output module 220 may transmit an indication from the recommendation module 218 to a user interface 210 of the AWASP controller 202. In a non-limiting example, the output module 220 may indicate a ranking order of one or candidate computing platforms that are suitable for migration of data and data-related workload from an original computing platform. In another non-limiting example, the output module 220 may indicate a recommendation of additional computing platform infrastructure for candidate computing platforms to alleviate deficiencies in service level capability.

In the illustrated example, the user interface 210 may display a visual indication of recommendations from the output module 220. Further, the user interface 210, may also include user controls that allow an operator to input customer requirements for use in selecting suitable candidate computing platforms. In some examples, customer requirements may be performance-based. In other examples, customer requirements may balance performance with cost. The user interface 210 may also include user controls that allow an operator to set a desired tolerance that is used to quantify an allowable difference between the key performance and utilization statistics of the synthetic workload and a user-generated workload.

In the illustrated example, the AWASP controller 202 may further include input/output interface(s) 230. The input/output interface(s) 230 may include any type of output interface known in the art, such as a display (e.g., a liquid crystal display), speakers, a vibrating mechanism, or a tactile feedback mechanism. Input/output interface(s) 230 also include ports for one or more peripheral devices, such as headphones, peripheral speakers, or a peripheral display. Further, the input/output interface(s) 230 may further include a camera, a microphone, a keyboard/keypad, or a touch-sensitive display. A keyboard/keypad may be a push button numerical dialing pad (such as on a typical telecommunication device), a multi-key keyboard (such as a conventional QWERTY keyboard), or one or more other types of keys or buttons, and may also include a joystick-like controller and/or designated navigation buttons, or the like.

In the illustrated example, the AWASP controller 202 may include one or more network interface(s) 232. The one or more network interface(s) 232 may include any sort of transceiver known in the art. For example, the one or more network interface(s) 232 may include a radio transceiver that performs the function of transmitting and receiving radio frequency communications via an antenna. In addition, the one or more network interface(s) 232 may also include a wireless communication transceiver and a near field antenna for communicating over unlicensed wireless Internet Protocol (IP) networks, such as local wireless data networks and personal area networks (e.g., Bluetooth or near field communication (NFC) networks). Further, the one or more network interface(s) 232 may include wired communication components, such as an Ethernet port or a Universal Serial Bus (USB).

FIG. 3 illustrates a block diagram of an example Platform Quality of Service (PQoS) Agent 302. The PQoS Agent 302 may correspond to PQoS Agent 114. In the illustrated example, the PQoS Agent 302 is a computer-implemented application that may execute on a computing platform in a monitoring state 304 and a synthetic load state 306. In a monitoring state 304, the PQoS Agent 302 may monitor and measure key performance and utilization statistics of a computing platform under a user-generated workload. The PQoS Agent 302 may operate according to parameters specified within a configuration file that is collocated on the computing platform. The configuration file may identify key performance and utilization statistics that relate to CPU, memory, file I/O, network I/O, and database I/O operations on the computing platform. The configuration file may further indicate one or more monitoring instances in which the PQoS Agent 302 is to monitor and measure the key performance and utilization statistics. For example, the configuration file may indicate that monitoring instances occur at regular time intervals, random time intervals, or at discrete points in time. The configuration file may also indicate a duration of each monitoring instance as well as an overall period of time in which the monitoring instances are to be performed. In a non-limiting example, the configuration file may indicate that the PQoS Agent 302 is to monitor and measure key performance and utilization statistics on an original computing platform for a three-hour duration, at regular 24 hour intervals, repeated over a 30-day period.

In a synthetic load state 306, the PQoS Agent 302 may cause a synthetic load to run on a computing platform, and subsequently monitor and measure key performance and utilization statistics of the computing platform under the synthetic load. The PQoS Agent 302 may execute the synthetic load according to a configuration parameter set within the configuration file that is collocated on the computing platform. The configuration parameter set may define the synthetic load as determined by the synthetic load module 216 of the AWASP controller 202. In various examples, the configuration parameter set may include parameters that define and drive load behavior in each algorithm class, namely CPU, memory, file I/O, network I/O, and database I/O. The parameters may include function, thread count, intensity, and function-specific parameters of each algorithm class.

In various examples, the PQoS Agent 302 may cause multiple threads of the synthetic load to run in a particular sequence or in parallel. The configuration parameter set may specify a particular order for executing various algorithm classes of the synthetic load based on an understanding that some operations may have a greater influence than others on the performance and utilization characteristics of a computing platform. In a non-limiting example, if file I/O operations greatly influence performance and utilization characteristics of a computing platform, the algorithm classes may be executed in an order that prioritizes file I/O operations.

Figure 4:
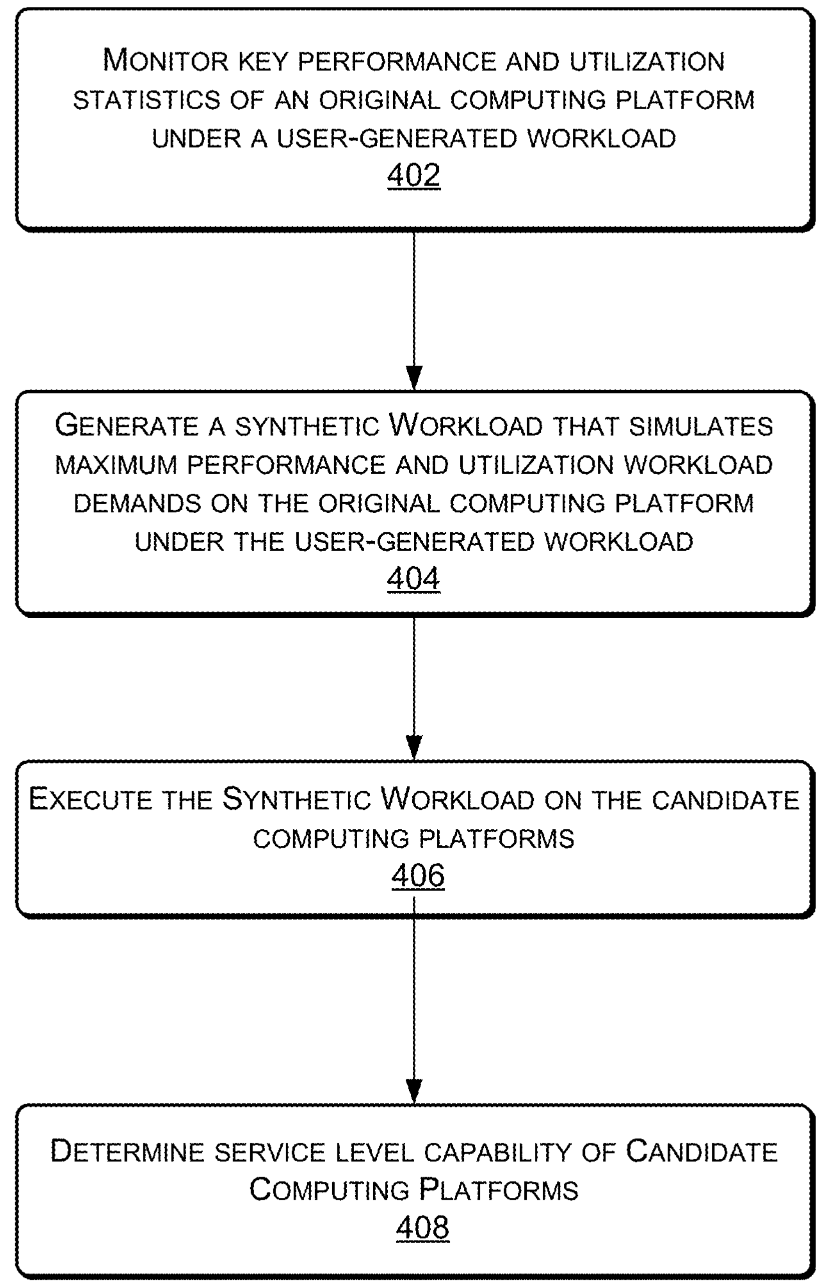
FIG. 4 illustrates a flow diagram that describes the general process of monitoring an original computing platform and ranking one or more candidate computing platforms as options for migration of data and data workload from the original computing platform.

FIG. 4 illustrates a flow diagram that describes the general process of monitoring an original computing platform and ranking one or more candidate computing platforms as migration options for the original computing platform. In various examples, the ranking of one or more computing platforms may be based on a comparison of key performance and utilization statistics of candidate computing platforms under a synthetic workload and key performance and utilization statistics of the original computing platform under a user-generated workload.

At 402, an AWASP controller may deploy a PQoS Agent onto an original computing platform to monitor and measure key performance and utilization statistics of the original computing platform under a user-generated workload. In various examples, the PQoS Agent may monitor the original computing platform over several monitoring instances, with each monitoring instance having a particular duration, and with each monitoring instance occurring within a particular period of time. In a non-limiting example, the AWASP controller may cause the PQoS Agent to monitor and measure key performance and utilization statistics on an original platform at three different monitoring instances, each having a three-hour duration, and each occurring within a 30-day period. Further, the key performance and utilization statistics may be used to generate a Resource Demand Index (RDI) that quantifies a performance and utilization workload demand of the original computing platform. Further, the AWASP controller may generate a Service Capability Index mark for the original computing platform based on the workload demand. The SCI mark may include an SCI rating, a coefficient of variance (CoV), and performance and utilization statistics relating to CPU, memory, file I/O, network I/O, and database I/O operations.

At 404, the AWASP controller may generate a synthetic workload that simulates the user-generated workload on the original computing platform. In various examples, the synthetic workload may be based on key performance and utilization statistics measured on the original computing platform. In various example, the synthetic workload may include a plurality of algorithm classes that drive workload behavior in a candidate computing platform. The plurality of algorithm classes may correspond to CPU, memory, file I/O, network I/O, and database I/O operations.

At 406, the AWASP controller may execute the synthetic workload on one or more candidate computing platforms. In doing so, the AWASP controller may monitor and measure key performance and utilization statistics of the one or more candidate computing platforms under the synthetic workload. The AWASP controller may select the one or more candidate computing platforms based on a comparison of the SCI mark for the original computing platform, and respective SCI marks for the one or more candidate computing platforms. In some examples, the comparison may be based on one or more components of the SCI mark, such as an SCI rating, coefficient of variance, and performance and utilization statistics relating to CPU, memory, file I/O, network I/O, and database I/O operations.

At 408, the AWASP controller may determine a service level capability of the one or more candidate computing platforms as options for migration of data and data workload from the original computing platform. In a non-limiting example, a candidate computing platform may be identified as successfully meeting workload demand on the original computing platform, under the user-generated workload. Alternatively, a candidate computing platform may be identified as having fallen short of meeting workload demand expectations. Further, service level capability may also be dependent on customer requirements, as well as a performance and utilization comparisons with the original computing platform. For example, customer requirements may prioritize candidate computing platforms based on any combination of criteria, including price/performance ratio. Thus, a candidate computing platform with less than optimal performance characteristics may be preferred in view of projected cost savings.

Figure 5:
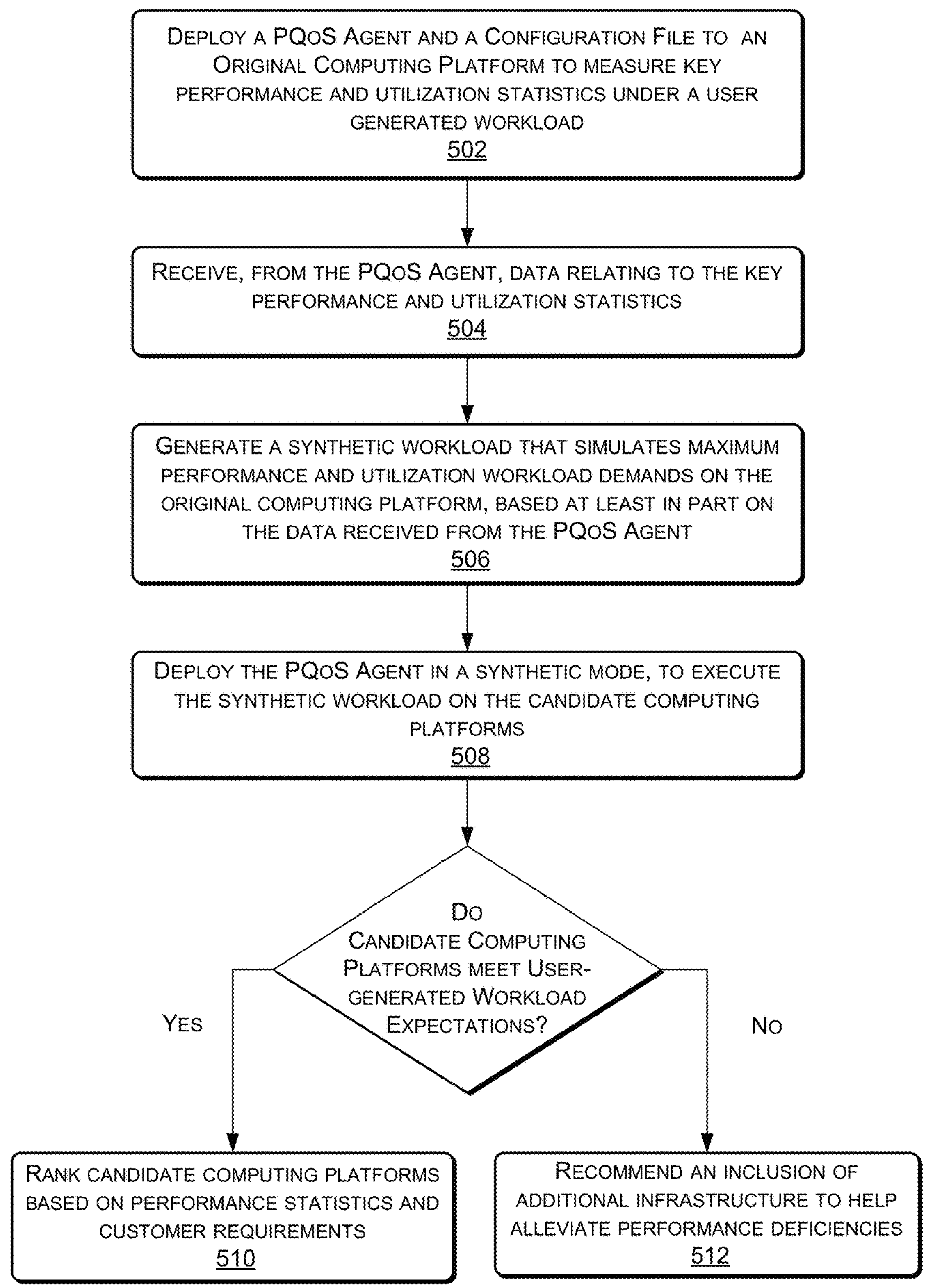
FIG. 5 illustrates a flow diagram that describes an automated process of generating a recommendation of candidate computing platforms for migration from an original computing platform.

FIG. 5 illustrates a flow diagram that describes an automated process of generating a recommendation of candidate computing platforms for migration from an original computing platform. In some examples, the candidate computing platforms may include bare metal direct-attached storage (DAS) hosts, traditional host services, and cloud environment platforms. The cloud-based platforms may include public, private, and a hybrid of public and private cloud-based platforms.

At 502, the AWASP controller may deploy a PQoS Agent and configuration file to an original computing platform. The PQoS Agent may monitor and measure key performance and utilization statistics of the original computing platform under a user-generated workload. The configuration file may identify a set of parameters that indicate key performance and utilization statistics that the PQoS Agent is to monitor and measure on the original computing platform. The key performance and utilization statistics may relate to CPU, memory, file I/O, network I/O, and database I/O operations on the original computing platform. The configuration file may also indicate one or more monitoring instances in which the PQoS Agent is to monitor and measure key performance and utilization statistics on the original computing platform. The configuration file may also indicate a duration of each monitoring instance as well as an overall period of time in which the monitoring instances are to be performed.

At 504, the AWASP controller may receive, from the PQoS Agent, data related to key performance and utilization statistics measured on the original computing platform. The AWASP controller may receive the data at a conclusion of each monitoring instance, or at any other point in time that is specified within the configuration file that is collocated with the PQoS Agent. The AWASP controller may analyze the data to determine a SCI rating of the original computing platform.

At 506, the AWASP controller may generate a synthetic workload that is based at least in part on the key performance and utilization statistics measured on the original computing platform. The synthetic workload is intended to simulate performance and utilization characteristics of the original computing platform under a user-generated workload. The AWASP controller may generate a synthetic workload that is comparable to a stable workload, a growing workload, a cyclic workload, a bursting workload, or an on-and-off workload pattern on the original computing platform. In some examples, the AWASP controller may include user controls that allow an operator to set a desired tolerance of key performance and utilization statistics between a synthetic workload and a user-generated workload. In a non-limiting example, a desired tolerance may vary between 5%, 3%, or 1% of key performance and utilization statistics measured by the PQoS Agent in a monitoring state and synthetic load state. Once the synthetic workload has been generated, a set of configuration parameters may be created and transmitted to a PQoS Agent that enables the PQoS Agent to deploy the synthetic workload on a candidate computing platform.

At 508, the AWASP controller may deploy the PQoS Agent in a synthetic load state onto one or more candidate computing platforms. In doing so, the PQoS Agent may execute the synthetic workload on the candidate computing platforms to measure key performance and utilization statistics under the synthetic workload. At a completion of the synthetic workload, the PQoS Agent may transmit data relating to key performance and utilization statistics of each of the one or more candidate computing platforms under the synthetic workload to the AWASP controller. The AWASP controller may then determine a service level capability of each candidate computing platform.

The service level capability of a candidate computing platform may be determined by comparing key performance and utilization statistics of the original computing platform under a user-generated load with key performance and utilization statistics of the one or more candidate computing platforms, under a synthetic load mode. The AWASP controller may indicate one of two possible outcomes, namely that the candidate computing platform has met or exceeded workload expectations as simulated by the synthetic workload, or that the candidate computing platform has not met workload expectations as simulated by the synthetic workload. As noted above, workload expectations refer to key performance and utilization statistics generated by the original computing platform under the user-generated workload.

At 510, the AWASP controller may determine that at least some candidate computing platforms have met or exceeded workload expectations as simulated by the synthetic workload. In this case, a platform indexing ranking and rating services (PIRRS) may assign each candidate computing platform that has met or exceeded workload expectations with an SCI mark based on an analysis of key performance and utilization statistics. The SCI mark may include an SCI rating, a CoV, and performance and utilization statistics of CPU, memory, file I/O, network I/O, and database I/O operations. These candidate computing platforms may then be ranked in an order that reflects performance, or in an order that reflects customer requirements.

At 512, the AWASP controller may determine that at least some candidate computing platforms have not met workload expectations as simulated by the synthetic workload. The AWASP controller may further analyze key performance and utilization statistics associated with each of these candidate computing platforms, and identify particular operations, such as CPU, memory, file I/O, network I/O, or database I/O that may have caused the lack of service level capability. The AWASP controller may further recommend an inclusion of additional CPU, memory, file I/O, network I/O, or database I/O infrastructure to help alleviate the deficiency in performance.

Figure 6:
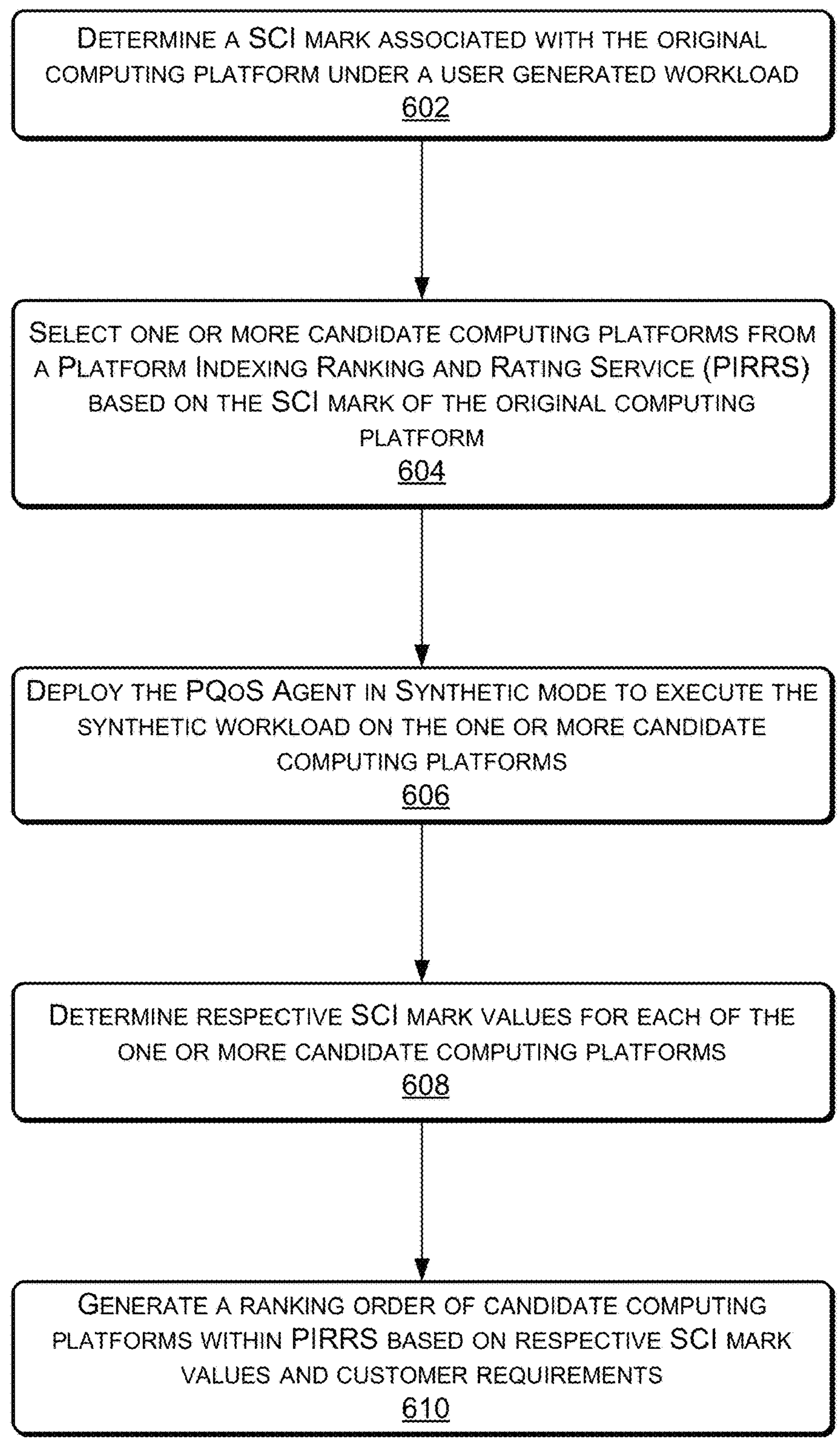
FIG. 6 illustrates a flow diagram that describes an automated process using a Platform Indexing Ranking and Rating Service (PIRRS) to select one or more candidate computing platforms, and ranking an order of the selected candidate computing platforms based on performance and customer requirements under a synthetic workload.

FIG. 6 illustrates a flow diagram that describes an automated process using a Platform Indexing Ranking and Rating Service (PIRRS) to select one or more candidate computing platforms, and ranking an order of the selected candidate computing platforms based on performance and customer requirements under a synthetic workload.

At 602, the AWASP controller may determine an SCI mark associated with the original computing platform under a user-generated workload. In various examples, the SCI mark may include an SCI rating, a coefficient of variance (CoV), and performance and utilization statistics relating to CPU, memory, file I/O, network I/O, and database I/O operations. Further, the SCI mark may be based on key performance and utilization statistics that were monitored by a PQoS Agent on the original computing platform.

At 604, the AWASP controller may identify one or more candidate computing platforms for migration of data and data-related workload from a Platform Indexing Ranking and Rating Service (PIRRS). In some examples, the PIRRS may identify a list of candidate computing platforms with a SCI mark that is similar to the SCI mark of the original computing platform. In this example, a comparison of the SCI mark for a candidate computing platform to the SCI mark assigned to the original computing platform may help reduce the list of prospective candidate computing platforms for migration. The PIRRS may provide comparative data relating to one or more components of the SCI mark for each candidate computing platform, such as SCI rating, the CoV, or the performance and utilization statistics relating to CPU, memory, file I/O, network I/O, and database I/O operations.

At 606, the AWASP controller may deploy the PQoS Agent and a configuration file on the identified candidate computing platforms to execute the synthetic workload. In various examples, the configuration file may include a set of parameters that define the synthetic workload, as well as indicate key performance and utilization statistics that the PQoS Agent is to monitor and measure.

At 608, the AWASP controller may determine respective SCI mark values for each of the one or more candidate computing platforms. The SCI mark values of the one or more candidate computing platforms, or components of SCI mark values, may then be used for direct comparison with equivalent SCI mark values, or components of SCI mark values, associated with the original computing platform.

At 610, the AWASP controller may upload the SCI mark values associated with the one or more candidate computing platforms into PIRRS. PIRRS may provide a ranking order of each candidate computing platform in an order that reflects performance, or in an order based on customer requirements. In the latter case, customer requirements may rank candidate computing platforms based on any combination of criteria, including price/performance ratio. In other words, a candidate computing platform with less than optimal performance characteristics, may be preferred in view of projected cost savings of another candidate computing platform with less than optimal performance characteristics.

Figure 7:
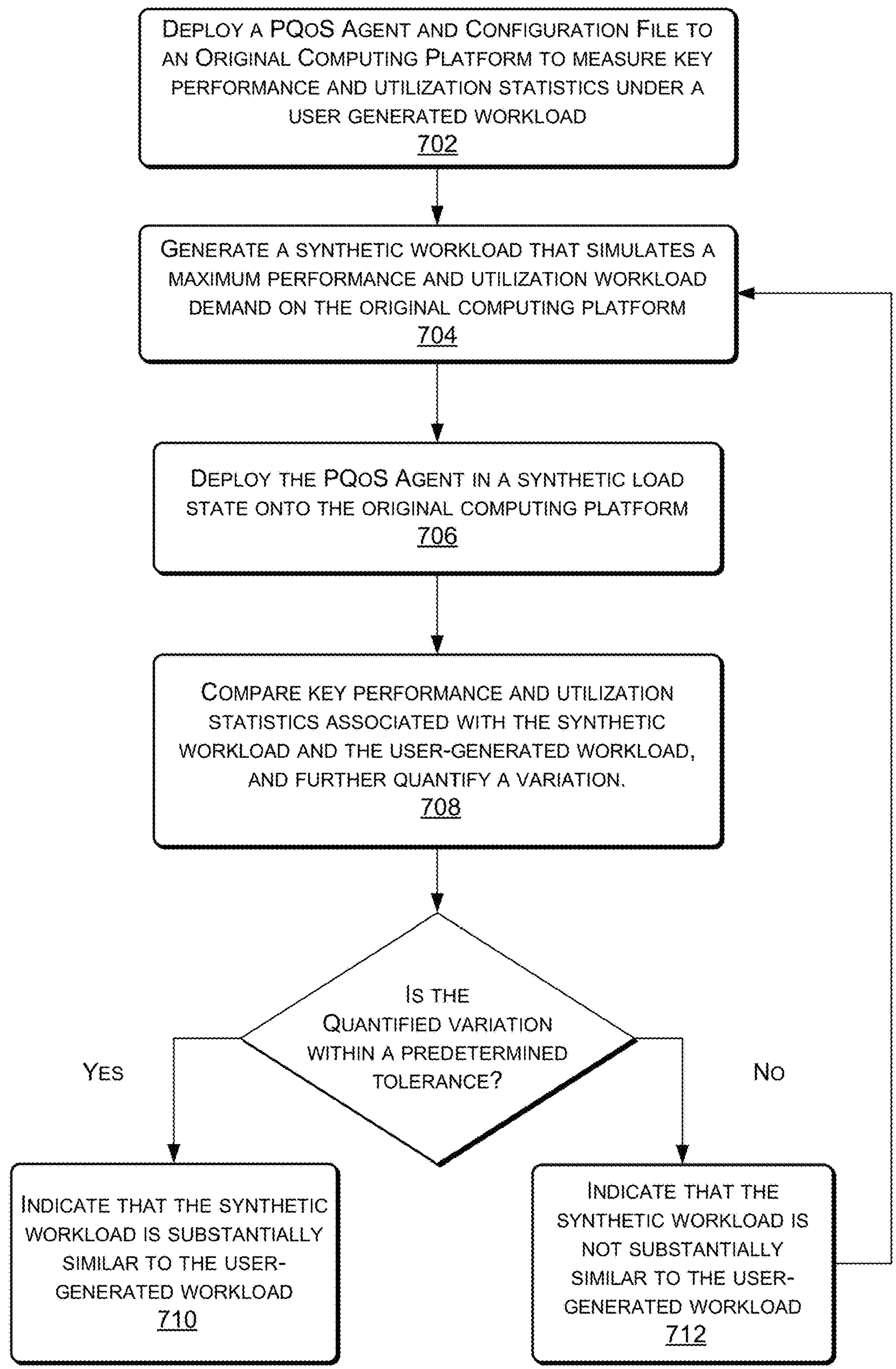
FIG. 7 illustrates a flow diagram that describes an automated process of generating a synthetic workload and retuning a synthetic workload for deployment on candidate computing platforms.

FIG. 7 illustrates a flow diagram that describes an automated process of generating a synthetic workload for deployment on candidate computing platforms. The AWASP controller may generate the synthetic workload to simulate key performance and utilization statistics of an original computing platform under a user-generated workload.

At 702, the AWASP controller may deploy a PQoS Agent and a configuration file to monitor and measure key performance and utilization statistics on an original computing platform under a user-generated workload. In some examples, the configuration file may include an indication of the key performance utilization statistics that the PQoS Agent is to monitor and measure. Further, the configuration file may outline that the PQoS Agent may be deployed in a monitoring state for one or more instances over a predetermined period of time. By increasing the number of monitoring instances, or the period of time over which the monitoring and measuring operation occurs, the PQoS Agent can increase an amount of data that can ultimately be used to generate a synthetic workload. In doing so, the AWASP controller may generate a more accurate synthetic workload that better reflects the user-generated workload observed on the original computing platform.

At 704, the AWASP controller may generate a synthetic workload based at least in part on the measured key performance and utilization statistics from the original computing platform. The AWASP controller may generate a plurality of algorithm classes that drive workload behavior in a candidate computing platform. In a non-limiting example, the plurality of algorithm classes may be directed towards performance of CPU, memory, file I/O, network I/O, and database I/O operations. The AWASP controller may further determine a number of threads to spawn for each algorithm class, in addition to an intensity associated with individual thread. An intensity setting may scale the workload of a particular thread relative to other threads that are being executed in combination. In a non-limiting example, consider a synthetic workload that simulates a file I/O operation in combination with a memory operation. The AWASP controller may specify a higher intensity setting for the file I/O operations relative to memory operations. This can cause threads associated with a file I/O operation to have higher scaled workloads relative to memory operations. In doing so, results from the synthetic workload may help discern whether performance characteristics of a candidate computing platform are limited by file I/O operations.

In various examples, the AWASP controller may execute algorithm classes of the synthetic workload in a sequential order. For example, if it is determined that file I/O operations may influence simulating a synthetic workload with a user-generated workload, the algorithm classes may be executed in an order of file I/O, network I/O, CPU, and memory operations. In other examples, the algorithm classes may be executed in parallel.

At 706, the AWASP controller may re-deploy the PQoS Agent in a synthetic load state to execute the synthetic workload on the original computing platform. In doing so, the PQoS Agent may monitor and measure the same key performance and utilization statistics that were monitored and measured by the PQoS Agent during its initial monitoring operation at 502. The purpose of doing so is to ensure that the synthetic workload generates a workload that is substantially similar to the previously observed user-generated workload. It is noteworthy that all other user applications should be closed on the original computing platform while the synthetic workload is being run. This ensures that the PQoS Agent monitors and measures performance data attributed solely to the synthetic workload.

In some examples, the AWASP controller may re-deploy the PQoS Agent, in the synthetic load state, on the same computing platform as the original computing platform. By using the same computing platform to measure an accuracy of the synthetic workload relative to a user-generated workload, the AWASP controller can eliminate a risk of discrepancies being caused by differences in computing platform infrastructure. In other examples, the AWASP controller may re-deploy the PQoS Agent in a synthetic load state on a different computing platform that is substantially similar to the original computing platform. A benefit of doing so is that user applications on the original computing platform need not close while the synthetic load is being run.

At 708, the AWASP controller may compare the key performance and utilization statistics of the synthetic workload with the key performance and utilization statistics of the user-generated workload. The AWASP controller may further quantify a variation between the key performance and utilization statistics of the synthetic workload and the user-generated workload. The quantified variation may be used to determine whether the synthetic workload is substantially similar to the user-generated workload.

At 710, the AWASP controller may determine that the quantified variation between the key performance and utilization statistics of the synthetic workload and the user-generated workload is within a predetermined tolerance. The AWASP controller may further indicate that the synthetic load is substantially similar to the user-generated load, and thus re-deploy the PQoS Agent to a candidate computing platform to measure a service level capability of the candidate computing platform under the synthetic load.

At 712, the AWASP controller may determine that the quantified variation between the key performance and utilization statistics of the synthetic workload and the user-generated workload is greater than a predetermined tolerance. That is, the synthetic workload is not similar enough to the user-generated workload, and thus cannot be used as part of a process of selecting a candidate computing platform.

In this instance, the AWASP controller may re-configure the synthetic workload and cause the re-configured synthetic workload to be re-run until an appropriate result can be achieved. The synthetic workload may be re-configured by modifying the general algorithm class parameters or the function-specific parameters that relate to CPU, memory, file I/O, network I/O, and database I/O operations.

Moreover, it is noteworthy that the purpose of executing the synthetic workload on the original computing platform is not to simulate a scripted simulation of a user-generated workload. Instead, the purpose is to simulate operational limits that correspond to CPU, memory, file I/O, network I/O, and database I/O operations observed under a user-generated workload. Thus, by simulating operational limits of an original computing platform under a user-generated workload, the synthetic workload may better determine service level capabilities (i.e., operational limits) of candidate computing platforms.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A system comprising:

one or more processors;

memory coupled to the one or more processors, the memory including one or more modules that are executable by the one or more processors to:

receive an original set of key performance and utilization statistics that are associated with a first computing platform, the original set of key performance and utilization statistics corresponding to an execution of a user-generated workload on the first computing platform;

generate a synthetic workload that simulates the user-generated workload, based at least in part on the original set of key performance and utilization statistics;

execute the synthetic workload on the first computing platform to generate a first set of key performance and utilization statistics;

determine whether a difference between the first set of key performance and utilization statistics and the original set of key performance and utilization statistics are within a predetermined tolerance;

in response to the difference not being within the predetermined tolerance, tune the first set of key performance and utilization statistic;

identify a set of candidate computing platforms for migration of data from the first computing platform, based at least in part on the original set of key performance and utilization statistics;

deploy the synthetic workload on a second computing platform of the set of candidate computing platforms;

receive a second set of key performance and utilization statistics from the second computing platform, based at least in part on execution of the synthetic workload on the second computing platform; and determine whether to recommend the second computing platform for migration of data from the first computing platform, based at least in part on a comparison of the first set of key performance and utilization statistics and the second set of key performance and utilization statistics.

2. The system of claim 1, wherein the one or more modules are further executable by the one or more processors to:

generate a configuration file for deployment on the first computing platform, the configuration file including an indication of the first set of key performance and utilization statistics to be measured on the first computing platform in response to the execution of the user-generated workload; and deploy a Platform Quality of Service (PQoS) Agent and the configuration file onto the first computing platform, the PQoS Agent to measure the first set of key performance and utilization statistics on the first computing platform based at least in part on the configuration file.

3. The system of claim 2, wherein the configuration file further includes an indication of at least a first instance and a second instance for measuring the first set of key performance and utilization statistics on the first computing platform, the indication identifying a duration of the first instance and the second instance, and a time interval between the first instance and the second instance.

4. The system of claim 1, wherein, to tune the second set of key performance and utilization statistics further includes modifying general algorithm class parameters or function-specific parameters associated with CPU, memory, file input/output, network input/output, or database input/output operations.

5. The system of claim 1, wherein the one or more modules are further executable by the one or more processors to:

quantify a parameter that defines an algorithm class of the synthetic workload, the algorithm class being associated with one of a central processing unit (CPU) operation, a memory operation, a file input/output operation, or a database input/output operation.

6. The system of claim 1, wherein the one or more modules are further executable by the one or more processors to:

in response to determining that the second computing platform is not recommended for migration of data, recommend inclusion of an additional one of CPU, memory, file input/output, network input/output, or database input/output to the second computing platform.

7. The system of claim 1, wherein the one or more modules are further executable by the one or more processors to:

receive, customer requirements that include one or more criteria for selection of a computing platform for migration, and wherein, to determine whether to recommend the second computing platform for migration of data from the first computing platform is further based at least in part on the customer requirements.

8. A computer-implemented method, comprising:

under control of one or more processors:

receiving, from a Platform Quality of Service (PQoS) Agent, a first set of key performance and utilization statistics that are associated with a first computing platform, the first set of key performance and utilization statistics corresponding to an execution of a user-generated workload on the first computing platform;

generating a synthetic workload that simulates the user-generated workload, based at least in part on the first set of key performance and utilization statistics;

identifying a set of candidate computing platforms for migration of data from the first computing platform, based at least in part on the first set of key performance and utilization statistics;

quantifying a parameter that defines an algorithm class of the synthetic workload, the algorithm class being associated with a central processing unit (CPU) operation, a memory operation, a file input/output operation, or a database input/output operation;

causing the PQoS Agent to execute the synthetic workload on a second computing platform of the set of candidate computing platforms, based at least in part on an indication of the parameter and the algorithm class, the PQoS Agent to further measure a second set of key performance and utilization statistics that corresponds to an execution of the synthetic workload on the second computing platform;

receiving, from the PQoS Agent, the second set of key performance and utilization statistics; and determining whether to recommend the second computing platform for migration of data from the first computing platform, based at least in part on a comparison of the first set of key performance and utilization statistics and the second set of key performance and utilization statistics; and in response to determining not to recommend the second computing platform for migration of data from the first computing platform, providing a recommendation to include an additional operation to alleviate a deficiency in the second computing platform.

9. The method of claim 8, wherein generating the synthetic workload further comprises:

generating a configuration file that includes the indication of the algorithm class and the parameter; and deploying the configuration file onto the second computing platform, and wherein causing the PQoS Agent to execute the synthetic workload on the second computing platform is based at least in part on the configuration file.

10. The method of claim 8, wherein the algorithm class is a first algorithm class and the parameter is a first parameter, and further comprising:

identifying a second algorithm class for execution on the second computing platform based at least in part on the first set of key performance and utilization statistics, the second algorithm class being different from the first algorithm class;

determining a second parameter that defines an operation of the second algorithm class; and determining an order of execution for the first algorithm class and the second algorithm class, based at least in part on the first set of key performance and utilization statistics, and wherein the synthetic workload is based at least in part on the order of execution.

11. The method of claim 8, wherein the parameter corresponds to at least one of a function parameter, a thread count parameter, an intensity parameter, and a file size parameter.

12. The method of claim 8, further comprising:

receiving customer requirements that include one or more criteria for selection of a computing platform for migration, and wherein, providing the recommendation associated with the second computing platform is further based at least in part on the customer requirements.

13. The computer-implemented method of claim 8, wherein the additional operation is associated with one of the central processing unit (CPU) operation, the memory operation, the file input/output operation, or the database input/output operation.

14. One or more non-transitory computer-readable media storing computer-executable instructions, that when executed on one or more processors, causes the one or more processors to perform acts comprising:

receiving an original set of key performance and utilization statistics that are associated with an original computing platform, the original set of key performance and utilization statistics corresponding to an execution of a user-generated workload on the original computing platform;

generating a synthetic workload that simulates the user-generated workload, based at least in part on the original set of key performance and utilization statistics;

executing the synthetic workload on the original computing platform to generate a first set of key performance and utilization statistics;

determining whether a difference between the first set of key performance and utilization statistics and the original set of key performance and utilization statistics is within a predetermined tolerance;

in response to the difference not being within the predetermined tolerance, tuning the first set of key performance and utilization statistics;

executing the synthetic workload on a plurality of candidate computing platforms;

receiving additional sets of key performance and utilization statistics that correspond to individual candidate computing platforms of the plurality of candidate computing platforms, the additional sets of key performance and utilization statistics corresponding to an execution of the synthetic workload on the individual candidate computing platforms; and providing a recommendation associated with the individual candidate computing platforms, based at least in part on a comparison of the first set of key performance and utilization statistics and the additional sets of key performance and utilization statistics.

15. The one or more non-transitory computer-readable media of claim 14, prior to causing the synthetic workload to execute on the plurality of candidate computing platforms, further comprising:

causing, at a first instance, the synthetic workload to execute on the original computing platform based at least in part on a first configuration file collocated on the original computing platform;

receiving a second set of key performance and utilization statistics that correspond to an execution of the synthetic workload on the original computing platform;

determining that a similarity between the first set of key performance and utilization statistics and the second set of key performance and utilization statistics is within the predetermined tolerance;

modifying at least one parameter within the first configuration file based at least in part on the first set of key performance and utilization statistics and the second set of key performance and utilization statistics, the at least one parameter defining an algorithm class of the synthetic workload;

deploying a second configuration file to the original computing platform, the second configuration file including the at least one parameter; and causing, at a second instance, the synthetic workload to execute on the original computing platform based at least in part on the second configuration file.

16. The one or more non-transitory computer-readable media of claim 15, further comprising receiving a user input that corresponds to the predetermined tolerance.

17. The one or more non-transitory computer-readable media of claim 14, further comprises:

generating a configuration file for deployment on the original computing platform, the configuration file including an indication of the first set of key performance and utilization statistics to measurement response to the execution of the user-generated workload; and deploying the configuration file on the original computing platform, and wherein receiving the first set of key performance and utilization statistics is based at least in part on the configuration file.

18. The one or more non-transitory computer-readable media of claim 14, further storing instructions that, when executed cause the one or more processors to perform acts comprising:

determining that a particular computing platform of the individual candidate computing platforms is not recommended for migration of data; and generate the recommendation for the particular computing platform that recommends an inclusion of an additional one of CPU, memory, file input/output, network input/output, or database input/output to the particular computing platform.

19. The one or more non-transitory computer-readable media of claim 14, further storing instructions that, when executed cause the one or more processors to perform acts comprising:

generating a resource demand index (RDI) that quantifies a performance and utilization workload demand of the original computing platform, based at least in part on the original set of key performance and utilization statistics, and wherein, providing the recommendation associated with the individual candidate computing platforms is based at least in part on the RDI.

20. The one or more non-transitory computer-readable media of claim 14, wherein, tuning the first set of key performance and utilization statistics further includes modifying a function parameter, thread count parameter, or an intensity parameter, wherein, the function parameter defines a load pattern in one or more algorithm classes, the thread count parameter indicates a number threads to spawn for the one or more algorithm classes, and the intensity parameter indicates a scale of a thread workload for a particular thread relative to a plurality of threads being executed.

* * * * *